United States Patent [19]

Sagishima et al.

[11] 3,749,824

[45] July 31, 1973

[54] SUPPRESSION FILTER FOR CARRIER-CHROMINANCE SIGNALS UTILIZING A TOPPED DELAY LINE

[75] Inventors: Takayuki Sagishima, Moriguchi; Reiichi Sasaki, Hirakata; Yoshitomi Nagaoka, Neyagawa, all of Japan

[73] Assignee: Matsushita Electric Industrial Co. Ltd., Kadoma, Osaka, Japan

[22] Filed: June 11, 1971

[21] Appl. No.: 152,152

[30] Foreign Application Priority Data

July 20, 1970 Japan ............................ 45/64079
July 20, 1970 Japan ............................ 45/64080

[52] U.S. Cl. ............................ 178/5.4 R, 333/70 R
[51] Int. Cl. ............................ H04n 9/12
[58] Field of Search .................. 178/5.4 R, 5.4 ML, 178/5.4 CK; 330/21, 31, 56, 109; 333/73 C, 29, 31 R, 70 R

[56] References Cited

UNITED STATES PATENTS

| | | | |
|---|---|---|---|
| 2,921,121 | 1/1960 | Grundmann | 178/5.4 R |
| 2,910,528 | 10/1959 | Petersen | 178/5.4 R |
| 2,895,004 | 7/1959 | Fredendall | 178/5.4 R |
| 3,546,372 | 12/1970 | Dischert et al. | 178/5.4 R |

*Primary Examiner*—Robert L. Richardson
*Attorney*—E. F. Wenderoth, V. M. Creedon et al.

[57] ABSTRACT

A suppression filter for carrier-chrominance signal components in color picture signals for the luminance channel of a color television receiver which acts only when color picture signals are being received. The filter has a delay line with an appropriate delay time, one end of which is open-circuited to reflect the signals when color picture signals are being received and which has a characteristic impedance which can be coupled to the one end so that it does not reflect the signals when monochromatic picture signals are being received.

2 Claims, 3 Drawing Figures

INVENTORS
TAKAYUKI SAGISHIMA
REIICHI SASAKI
YOSHITOMI NAGAOKA

BY Wenderoth, Lind & Ponack
ATTORNEYS

INVENTORS
TAKAYUKI SAGISHIMA
REIICHI SASAKI
YOSHITOMI NAGAOKA

BY Wenderoth, Lind & Ponack
ATTORNEYS

SUPPRESSION FILTER FOR CARRIER-CHROMINANCE SIGNALS UTILIZING A TOPPED DELAY LINE

FIELD OF THE INVENTION

The present invention relates to a novel and improved filtering apparatus for suppressing the carrier-chrominance signal components in the luminance channel of a color television receiver.

DESCRIPTION OF THE PRIOR ART

In the NTSC system, color information is conveyed by the modulated chrominance subcarrier located within the video frequency band. In order to make the visibility of the subcarrier low, a subcarrier frequency is chosen which is an odd multiple of half the line scanning frequency and half the field scanning frequency. In such a case, the subcarrier produces opposite dot patterns in successive lines and in successive fields on a screen. If the integrating action of the eye is complete and the display system in linear, the average light output due to the subcarrier signal is zero for all picture elements during each two complete picture scannings.

However, the integrating action of the eye is not ideal. The cancellation of light outputs by the subcarrier signals is not perfect even with a linear display system. In practice, a display system is always nonlinear. This causes non-linear distortion of the subcarrier signals, the visibility of which is therefore considerably increased. Moreover, the subcarrier rectification by the non-linearity of the display tube leads to intolerable color desaturation.

The crosstalk effect of the subcarrier can be reduced by inserting into the luminance channel of a color television receiver a suppression filter for filtering the subcarrier frequency. This suppression filter is usually a resonant circuit consisting of an inductor and a capacitor with the resonant frequency at the subcarrier frequency. In this filter, both the resonant frequency and bandwidth of the filter change together according to the variation of the value of the capacitor or of the inductor. Therefore, it is difficult to establish both the resonant frequency and the bandwidth independently of each other from the values of either of the elements. Moreover, in practice it is difficult to obtain a suppression filter consisting of an inductor and a capacitor with an arbitrary bandwidth because of the limitations of the characteristics of real elements, for example the loss-resistance of an inductor or the self-capacitance of an inductor.

SUMMARY OF THE INVENTION

It is an object of the present invention to provide a new suppression filter for the carrier-chrominance signals which does not use an inductor and a capacitor.

It is another object of the present invention to provide a new suppression filter for the carrier-chrominance signals in the luminance channel of a color television receiver utilizing the delay line used in the luminance channel of a conventional color television receiver to compensate for the delay-time difference in the chrominance and luminance channels.

It is a further object of the present invention to provide a new suppressing filter for the carrier-chrominance signals, which filter does not operate when monochromatic picture signals are being received.

Briefly stated, to achieve the foregoing objects the suppression filter for carrier-chrominance signals comprises an amplifying means for amplifying color picture signals, which is coupled to a video signal source; a delay line having a tap between a first end and a second end of the delay line coupled to the output terminal of the amplifying means, the delay time between the first end and the tap being $1/4f_s$ where $f_s$ is a subcarried frequency, wherein the delay time be-tween the tap and the second end of the delay line compensates for the delay time between the luminance channel and the chrominance channel, a feedback means for providing negative feedback of the output signal of said amplifying means, which feedback means has an input terminal coupled to said output terminal of said amplifying means and an output terminal coupled to the input terminal of said amplifying means; and a terminating means for altering a terminating impedance responsive to the presence of a color signal, and which is coupled to the first end of said delay line. With this arrangement, the frequency to be suppressed is decided only by the delay-time between the first end and the top and the bandwidth of said suppression filter is decided only by the quantity of feedback from said feedback means. The suppression action for the carrier-chrominance signal components is discontinued when the monochrome picture signals are being received. The reason is that said delay line is terminated with its characteristic impedance and no reflection occurs at said receiving end of said delay line at that time.

DESCRIPTION OF DRAWINGS

These and other features of the invention will be apparent from the following description of the invention taken in connection with the accompanying drawings, in which.

DESCRIPTION OF PREFERRED EMBODIMENTS

Figure 1:
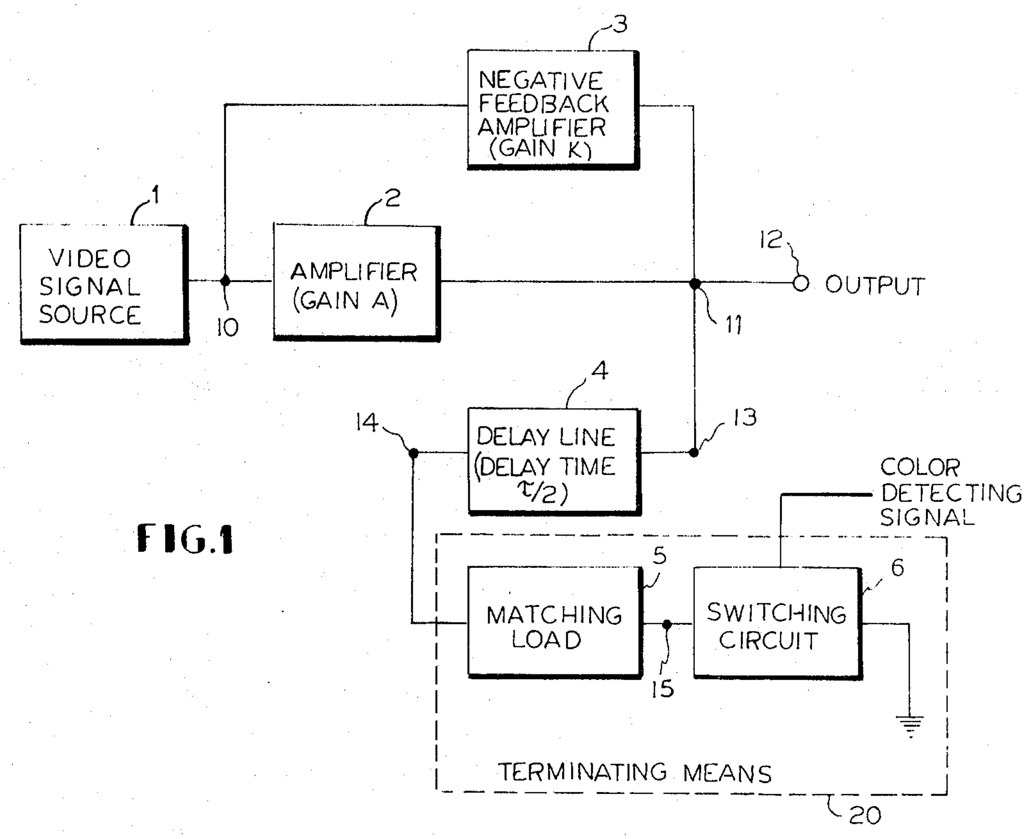
FIG. 1 is a block diagram of an embodiment of a suppression filter apparatus for the carrier chrominance signals for explaining the present invention.

Referring to FIG. 1, an amplifier 2 having gain A is coupled to the video signal source 1 in a color television receiver and amplifies color picture signals in the video frequency band. A negative feedback amplifier 3 with gain $k$ feeds the signal from an amplifier output terminal 11 negatively back to an input terminal 10 of said amplifier 2. A sending end 13 of a delay line 4 is coupled to said terminal 11 and said delay line 4 has a delay time of $\tau/2$. When the receiving end 14 of said delay line 4 is open-circuited, signals fed from said sending end 13 of said delay line 4 are reflected at said receiving end 14 without changing their polarity and are returned to the sending end 13 after time $\tau$ practically without changing the amplitude thereof. In this case, the relation between the output signals $F_o$ at an output terminal 12 and input signal $F_i$ at said terminal 10 is as follows:

$$F_o = A(F_i - kF_o)\ exp(-j2\pi f\tau) + A(F_i - kF_o) \quad (1)$$

where $f$: frequency $j = \sqrt{-1}$

The transfer function $H(f)$ of the circuits shown in FIG. 1, when said receiving end 14 is open-circuited, in as follows:

$$H(f) = (F_o/F_i) = A[1+exp(-j2\pi f\tau)]/[1+Ak + Ak\, exp(-j2\pi f\tau)] \quad (2)$$

$H(f)$ is zero when the frequency $f$ is $f_{on}$.

$$f_{on} = (2n + 1)/(2\pi), \quad (3)$$

where $n$ is a positive integer or zero.

Figure 2:
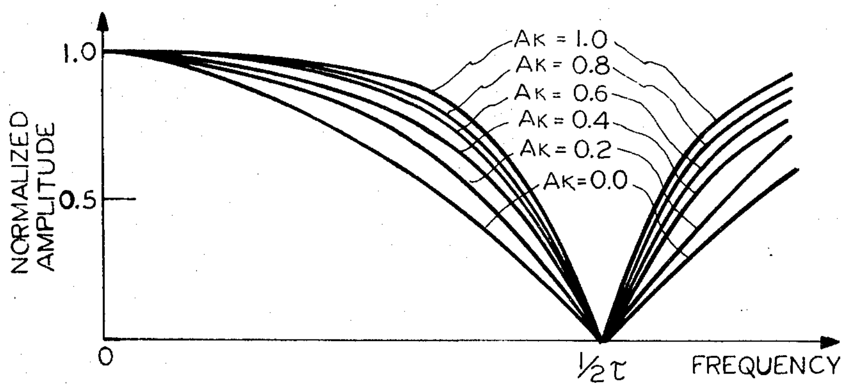
FIG. 2 is a graph illustrating a frequency response of the suppression filter shown in FIG. 1.

Therefore, when the relationship between $\tau$ and a subcarrier frequency $f_s$ is expressed by the following equation:

$\tau = (1/2f_s) = 0.14$ microseconds in the NTSC system, $H(f)$ is zero at the subcarrier frequency. At frequencies corresponding to the equation 3 where $n$ is 1 or more than 1, $H(f)$ is also zero. But these frequencies are higher than the transmitting video signal bandwidth 4.2 MHz. For example, $f_{o1} \approx 10.74$ MHz at $n$=1. In conclusion, the apparatus shown in FIG. 1 suppresses only carrier-chrominance signal components in the color picture signals when said delay time $\tau/2$ of said delay line 4 is $1/4f_s$ (about 0.07 microseconds), and said receiving end 14 of said delay line 4 is open-circuited. The frequency responses of the amplitude $|H(f)|$ of the circuits shown in FIG. 1 are illustrated as a function of $Ak$ in FIG. 2. Each response shown in FIG. 2 is normalized by its amplitude at zero frequency. The bandwidth of the suppression filter varies with a change in the negative feedback quantity factor $Ak$.

In FIG. 1 a terminating means 20 controls said suppression action in accordance with the sort of television signals being received. Said suppression action for the carrier-chrominance signal components is discontinued when said receiving end 14 is coupled to its characteristic impedance because no reflection occurs at said receiving end 14. One end of a matching load 5 having an impedance equal to the characteristic impedance of said delay line 4 is connected to said receiving end 14 of said delay line 4. The other end 15 of the matching load 5 is grounded through a switching circuit 6. Said switching circuit 6 conducts when the monochromatic picture signals are being received and does not conduct when the color picture signals are being received. When the color picture signals are being received, said switching circuit 6 does not conduct, and isolates said end 15 from ground. Then the receiving end 14 of said delay line 4 is open-circuited and the carrier-chrominance signal components in the color picture signals are suppressed at the output terminal 12. On the contrary, while the monochromatic picture signals are being received, said switching circuit 6 conducts and then said receiving end 14 of said delay line 4 is supplied with said matching load 5. Therefore no reflection of the signals occurs at the receiving end 14 and the apparatus does not suppress the carrier-chrominance signal components. The bandwidth of the luminance channel having this apparatus is still broad, and no deterioration of the resolution occurs when the monochromatic picture signals are being received.

Figure 3:
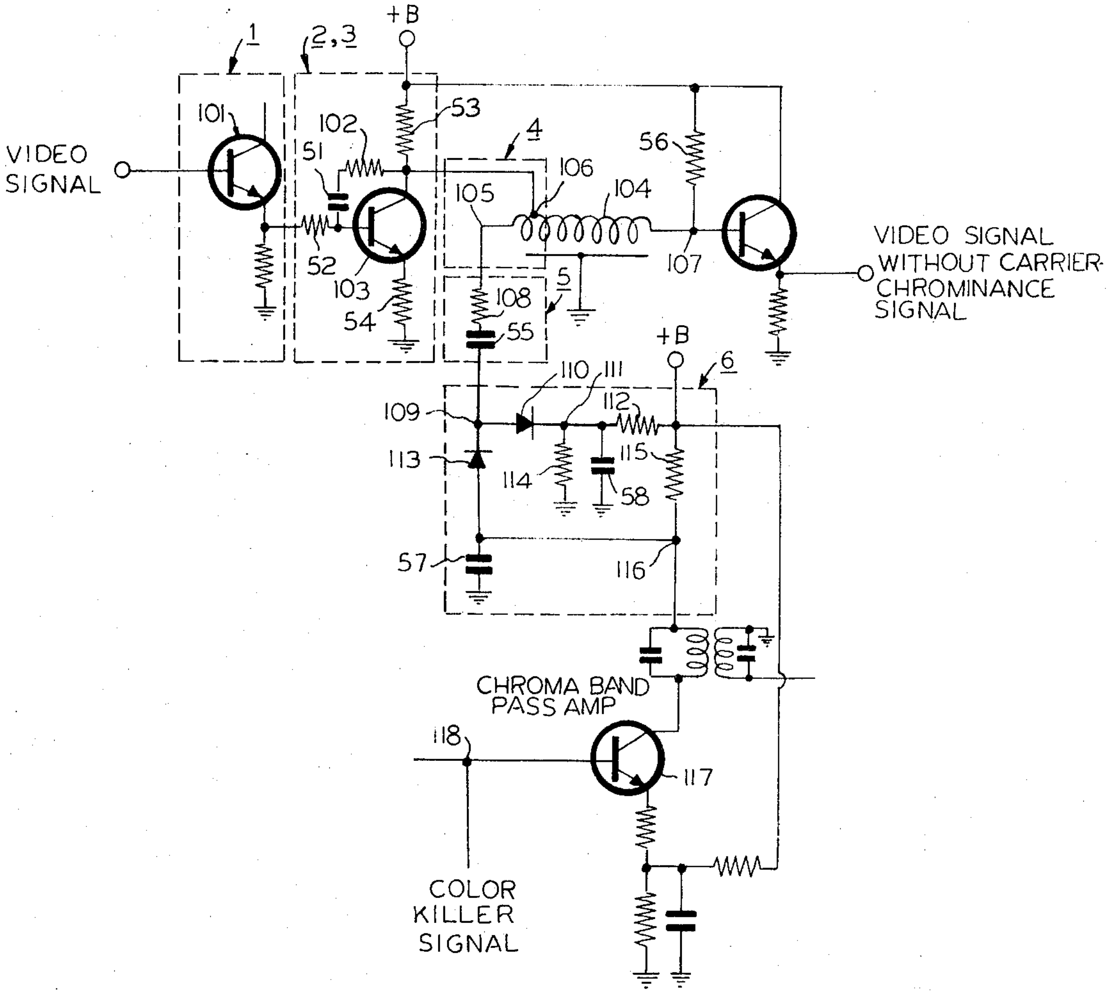
FIG. 3 is a schematic diagram of an embodiment of a suppression filter apparatus for the carrier chrominance signals in accordance with the present invention.

With reference to FIG. 3, there is illustrated an embodiment of the present invention. Generally, the luminance channel of a color television receiver employs a distribution type delay line having a delay time of about one microsecond to compensate for the delay time between the luminance channel and the chrominance channel. In the present invention this conventional delay line is replaced with a tapped delay line 104 shown in FIG. 3. The delay time between a terminal 106 and terminal 107 is a specific time to compensate for the delay time between the luminance channel and the chrominance channel, generally about one microsecond. The delay-time between said terminal 106 and terminal 105 is $1/(4f_s)$ 0.07 microseconds. A resistor 102 for negative feedback is inserted between the collector and the base of a transistor 103 for driving said delay line 104. When said terminal 105 of said delay line 104 is open-circuited, the suppression action occurs at said terminal 106, that is, the carrier-chrominance signal components in the color picture signals from the first video amplifier 101 are suppressed at said terminal 106. The bandwidth of the suppression filter is varied by changing the value of said resistor 102. This suppression action for the carrier-chrominance signal components can be discontinued by connecting said delay line 104 at said terminal 105 with a resistor 108 having an impedance equal to the characteristic impedance of said delay line 104. A switching circuit as shown at 6 in FIG. 3 can be used to control said suppression action according to the sort of picture signal being received, that is, a color of monochromatic picture signal. Usually a color television receiver has a color killing action, that is, the action of the chrominance channel, usually that of the chroma band pass amplifier, is stopped by utilizing a color killer signal generated in the absence of the color burst signals in the receiving signals, only when the receiving signals are monochromatic picture signals. When stopping the chrominance channel by cutting off the band pass amplifier, here shown at 117, by the color killing signals at terminal 118, both diodes 110 and 113 of circuit 6 conduct, because the value of a resistor 112 is higher than that of a resistor 115. A terminal 109 between diodes 110 and 113 is connected to ground through capacitor 57, and terminal 105 of said tapped delay line 104 is connected through said resistor 108 and a capacitor 55 to terminal 109. When diodes 113 and 110 conduct, terminal 105 is thus conductive through resistor 108. On the other hand, when the color picture signals are received and the band pass amplifier 117 acts as the normal bandpass amplifier in the chrominance channel, said diodes 110 and 113 do not conduct, because the voltage at a point 111 determined by the ratio of the value of the resistors 112 and 114 is higher than that of the point 116. Therefore, said delay line 104 is open-circuited at terminal 105 and the suppression action for the carrier chrominance signals occurs at said terminal 106 when the color picture signals are received.

In the embodiment of FIG. 3, satisfactory results are obtained by employing the following specified components:

| | | |
|---|---|---|
| transistor | 101 | silicon transistor 2SC828A |
| resistor | 102 | more than 1.8 kilo-ohm |
| transistor | 103 | silicone transistor 2SC828A |
| resistor | 180 | 1.8 kilo-ohm |
| diode | 110 | germanium diode 0A90 |
| resistor | 112 | 2.2 kilo-ohm |

| | | |
|---|---|---|
| diode | 113 | germanium diode 0-90 |
| resistor | 114 | 6.8 kilo-ohm |
| resistor | 115 | 1.2 kilo-ohm |
| transistor | 117 | silicon transistor 2SC538A |
| capacitor | 51 | 10 microfard |
| resistor | 52 | 1 kilo-ohm |
| resistor | 53 | 1.8 kilo-ohm |
| resistor | 54 | 120 ohms |
| capacitor | 55 | 10 microfarad |
| resistor | 56 | 1.8 kilo-ohms |
| capacitor | 57 | 10 microfarads |
| capacitor | 58 | 10 microfarads |
| supply voltage | | +24 volts |

voltage at 116 in the active condition of transistor 117 15 volts.

It is intended that all matter contained in the foregoing description and the in the drawings shall be interpreted as illustrative only, not as limitative of the invention.

What is claimed is:

1. A suppression filter for carrier-chrominance signals comprising an amplifying means for amplifying color picture signals having an input terminal adapted to be coupled to video signal source and having an output terminal; a delay line having a tap between a first end and a second end thereof and coupled to said output terminal of said amplifying means, the delay time between said first end and said tap being $1/4f_s$ where $f_s$ is a subcarrier frequency, wherein the delay time between said tap and said second end compensates for the delay time between the luminance channel and the chrominance channel; feedback means for providing a negative feedback of the output signal at said amplifying means, and having an input terminal coupled to said output terminal of said amplifying means and an output terminal coupled to said input terminal of said amplifying means, and a terminating means coupled to said first end for altering the impedance at said first end responsive to the presence of a color signal.

2. A suppression filter as claimed in claim 1 wherein said terminating means comprises a matching load having a characteristic impedance of said delay line, and a switching circuit having a conductive means in series with said matching load and ground, and means for making said conductive means conducting for connecting said matching load to ground when monochromatic picture signals are being received and for making said conductive means non-conductive to disconnect said matching load from ground when color picture signals are being received.

* * * * *